United States Patent
Burr et al.

(10) Patent No.: US 12,045,612 B2
(45) Date of Patent: Jul. 23, 2024

(54) SPECIAL-PURPOSE DIGITAL-COMPUTE HARDWARE FOR EFFICIENT ELEMENT-WISE AGGREGATION, SCALING AND OFFSET

(71) Applicant: INTERNATIONAL BUSINESS MACHINES CORPORATION, Armonk, NY (US)

(72) Inventors: Geoffrey Burr, Cupertino, CA (US); Shubham Jain, Elmsford, NY (US); Milos Stanisavljevic, Langnau am Albis (CH); Yasuteru Kohda, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/931,537

(22) Filed: Sep. 12, 2022

(65) Prior Publication Data

US 2024/0086192 A1 Mar. 14, 2024

(51) Int. Cl.
*G06F 9/30* (2018.01)
*G06F 9/355* (2018.01)
*G06N 20/00* (2019.01)

(52) U.S. Cl.
CPC ........ *G06F 9/30036* (2013.01); *G06F 9/3555* (2013.01); *G06N 20/00* (2019.01)

(58) Field of Classification Search
CPC .... G06F 9/30036; G06F 9/3555; G06N 20/00
See application file for complete search history.

(56) References Cited

U.S. PATENT DOCUMENTS

| 10,177,947 B2 | 1/2019 | Agee |
| 10,469,486 B2 | 11/2019 | Baras et al. |

(Continued)

FOREIGN PATENT DOCUMENTS

| CN | 109389214 A | 2/2019 |
| TW | 202217603 A | 5/2022 |

OTHER PUBLICATIONS

Hayner, D. et al., "Arbitrary Anti-aliasing Scale & Rotation Based on index-tables"; ip.com (2002), IPCOM000010197D, 5 pgs.

(Continued)

*Primary Examiner* — Corey S Faherty
(74) *Attorney, Agent, or Firm* — Intelletek Law Group, PLLC; Gabriel Daniel, Esq.

(57) ABSTRACT

An efficient pipelined implementation of digital scaling, offset and aggregation operation supports element-by-element programmable scale and offset factors. The method includes time-multiplexed parallel pipelining of a plurality of digital data words, each of the plurality of digital data words encoding an N-bit signed integer, from one of a plurality of receive-registers through a datapath that can either (1) store the plurality of digital data words directly in a dedicated first memory, (2) store the plurality of digital data words directly in a dedicated second memory, or (3) direct the plurality of digital data words into a parallel set of fused-multiply-add units. The method further includes multiplying each digital data word by a corresponding data-word retrieved from the dedicated first memory to form product data words and adding the product data words to a corresponding data-word retrieved from the dedicated second memory to form an output sum-and-product data words.

20 Claims, 3 Drawing Sheets

(56) References Cited

U.S. PATENT DOCUMENTS

| 10,771,796 | B2 | 9/2020 | Rossato et al. | |
|---|---|---|---|---|
| 2019/0050717 | A1 | 2/2019 | Temam | |
| 2020/0026515 | A1 | 1/2020 | Valentine | |
| 2020/0311183 | A1* | 10/2020 | Simpson | G06F 17/16 |
| 2021/0255832 | A1 | 8/2021 | Ramesh | |
| 2023/0029006 | A1* | 1/2023 | Amaya | G06F 7/4812 |
| 2023/0046369 | A1* | 2/2023 | Lesso | G06F 7/5443 |

OTHER PUBLICATIONS

Kumar, S. et al., "Efficient Data Restructuring and Aggregation for I/O Acceleration in PIDX"; IEEE (2012); 11 pgs.

Disclosed Anonymously; "Network Functions Virtualization Cross-Connect"; ip.com (2019); IPCOM000257940D, 9 pgs.

Disclosed Anonymously; "Seamless Aggregation Member Link Transitioning To Reduce Power Consumption In Link Aggregation Of IEEE802.3AZ Based Links"; ip.com (2017); IPCOM000251429D, 14 pgs.

Office Action issued May 30, 2024 in counterpart Taiwanese Application No. 112118017, 5 pgs.

* cited by examiner

SPECIAL-PURPOSE DIGITAL-COMPUTE HARDWARE FOR EFFICIENT ELEMENT-WISE AGGREGATION, SCALING AND OFFSET

BACKGROUND

Technical Field

The present disclosure generally relates to digital-compute hardware, and more particularly, to an efficient pipelined implementation of digital scaling, offset, and aggregation operations, supporting element-by-element programmable scale and offset factors.

Description of the Related Art

Rapid improvements in AI hardware accelerators have been a hidden but pivotal driver of progress in Deep Neural Networks (DNNs). Better hardware enabled the training of very large networks with enormous datasets, as well as rapid inference of the resulting large and thus highly-capable DNN models. Current DNN hardware ranges from modern GPUs (Graphics Processing Units) with numerous features designed specifically for DNN training and inference, to specialized digital CMOS accelerators incorporating reduced precision, sparsity, dataflow architectures, hardware-software optimization, and very-large-area accelerator chips. In general, such accelerators must carefully orchestrate the flow of vast amounts of data between on-chip or off-chip volatile memories (SRAM and DRAM) and highly-specialized SIMD (Single Instruction Multiple Data) units. These units perform the multiply-accumulate instructions that dominate most DNN compute workloads. This dataflow not only encompasses the many neuron activations produced by each DNN layer, but also the DNN model-weights and partial-sums as well.

Recently, Compute-In-Memory (CIM) designs that can improve energy-efficiency (e.g., by performing the multiply-accumulate operations with time complexity within on-chip memory) do so by reducing the motion of DNN model-weights and partial-sums. By exploiting such weight-stationarity over a short timespan with volatile memories such as SRAM or DRAM or over longer timespans with slower and finite-endurance non-volatile memories (NVM) such as Flash, Resistive RAM (RRAM), Magnetic Random-Access Memory (MRAM), or Phase-Change Memory (PCM), CIM approaches can offer both high-speed and high energy-efficiency. These benefits can be seen across all DNN workloads, but are particularly pronounced for workloads that exhibit large fully-connected layers with low weight reuse. However, since most of these memories offer only binary or few-bit storage, spatial-multiplexing across multiple word- or bit-lines must be invoked to implement the multi-bit weights needed for state-of-the-art DNN performance. This trades off area and energy to achieve the necessary multiply-accumulate precision, typically paired with time-multiplexing on the word- or bitlines to support multi-bit activations.

Some emerging non-volatile memories, such as PCM and RRAM, exhibit a broad and continuous range of analog conductance states, offering a path towards high-density weight-storage. Such devices also introduce additional considerations, such as weight-programming errors, readout noise, and conductance drift. This Analog-AI paradigm, in which energy-efficient multiply-accumulate (MAC) operations are performed on area-efficient crossbar-array tiles of analog non-volatile memory, represents a particularly attractive form of Compute-In-Memory for hardware acceleration of DNN workloads. However, even though the vast majority of compute-operations are performed on the Analog-AI tiles, there remain a small but significant set of complex operations that need to be performed on each data-vector emerging from a given Analog-AI tile before that data-vector can be directed to a subsequent Analog-AI tile for more MAC operations. Such complex operations are best performed in the digital domain, and thus efficient and compact handling of massively-parallel data-vectors are a critical component of a successful Analog-AI system.

One of the advantages of digitizing the output data-vectors produced by each single-integration multiply-accumulate operations at the edge of an Analog-AI crossbar-array tile is the opportunity to simplify digital scaling and aggregation operations that may be involved.

For instance, it might be best to be able to arbitrarily downscale or upscale the aggregated data on a column-by-column basis for the following benefits: (1) in order to optimally encode neural network weights into device conductances after each MAC operation, (2) in order to adjust for gain and/or offset errors introduced by column-to-column variations in analog-to-digital conversion (ADC) performance, or (3) to implement vectorized neural-network scaling operations such as Batch-Norm on excitation vectors. Given the linearity of these scaling operations, all salient scaling operations can be collapsed into a single slope and offset value.

In addition, if the height of a neural network layer exceeds the number of rows available in each Analog-AI crossbar-array tile, it may be important to aggregate contributions across multiple different tiles. In the case of ADC scaling coefficients, each tile typically needs its own scale-factor, although there is only the need for one offset-factor per aggregation.

Presently, there is no efficient pipelined implementation of digital scaling, offset and aggregation operations, supporting element-by-element programmable scale and offset factors.

SUMMARY

According to various embodiments, a computing device, a non-transitory computer readable storage medium, and a method are provided for efficient vectorized-scaling, aggregation, and rectified-linear operations. In one aspect, the present disclosure provides an efficient pipelined implementation of digital scaling, offset and aggregation operations, supporting element-by-element programmable scale and offset factors. The known alternative solutions involve conventional microprocessor or multi-processor solutions utilizing a conventional memory space and an Instruction Set Architecture. However, such a general-purpose solution will be significantly less energy-efficient than the special-purpose digital-compute hardware according to the present disclosure.

In one embodiment, a method for efficient vectorized-scaling, aggregation, and rectified-linear operations includes time-multiplexed parallel pipelining of a plurality of digital data words, each of the plurality of digital data words encoding an N-bit signed integer, from one of a plurality of receive-registers through a datapath that can either (1) store the plurality of digital data words directly in a dedicated first memory, (2) store the plurality of digital data words directly in a dedicated second memory, or (3) direct the plurality of digital data words into a parallel set of fused-multiply-add units. The method further includes multiplying each digital data word by a corresponding data-word retrieved from the dedicated first memory to form product data words and adding the product data words to a corresponding data-word retrieved from the dedicated second memory to form an output sum-and-product data words.

In one embodiment, the dedicated first memory is a slope memory located directly next to processing units for energy-efficient access.

In one embodiment, the dedicated second memory is an offset/aggregation/residual memory located directly next to processing units for energy-efficient access, wherein the offset/aggregation/residual memory is a dual port memory capable of reading and writing data-words during the same execution cycle. This allows the processing units to overlap two activities: (1) the retrieval of offset values or previously-aggregated data-values that are situated later within a time-multiplexed sequence of data and which are just about to enter the scaling compute-pipeline; with (2), the simultaneous storage of just-updated data-values corresponding to an earlier point along that same time-multiplexed sequence, as said just-updated data-values emerge from the exit of the scaling compute-pipeline.

In one embodiment, the method further includes performing, by each of the fused-multiply-add units, a rectified-linear operation, wherein each of the plurality of data words having a negative value are replaced by zero.

In one embodiment, the method further includes storing the output sum-and-product data words back into the dedicated second memory as an aggregation result. In some embodiments, the method further includes programmatically controlling the output sum-and-product data words to provide the aggregation result to the dedicated second memory in a predetermined order.

In one embodiment, the method further includes directing the output sum-and-product data words to further time-multiplexed and pipelined data processing stages capable of processing sum-and-product data words.

In one embodiment, the method further includes, before storage into either the dedicated first memory or the dedicated second memory, reinterpreting each of the plurality of data words from N-bit signed integer representation into a potentially more than N-bit floating bit representation either by concatenating data-words across the plurality of data-words or by concatenating across a plurality of time-multiplexed steps. The method further includes, before directing the plurality of digital data words to the fused-multiply-add units, each data word is directly converted from N-bit signed-integer representation to the potentially more-than-N-bit floating-point representation. According to various embodiments, all computation and data-word storage are performed in the potentially more-than-N-bit floating-point representation.

In one embodiment, the method further includes programmatically controlling the dedicated first memory and the dedicated second memory to provide data words in a predetermined order.

By virtue of the concepts discussed herein, a system and method are provided that improves upon the approaches currently used in digital scaling, offset and aggregation operations. The system and methods discussed herein have the technical effect of improving energy efficiency in digital scaling, offset and aggregation operations while supporting element-by-element programmable scale and offset factors.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Figure 1:
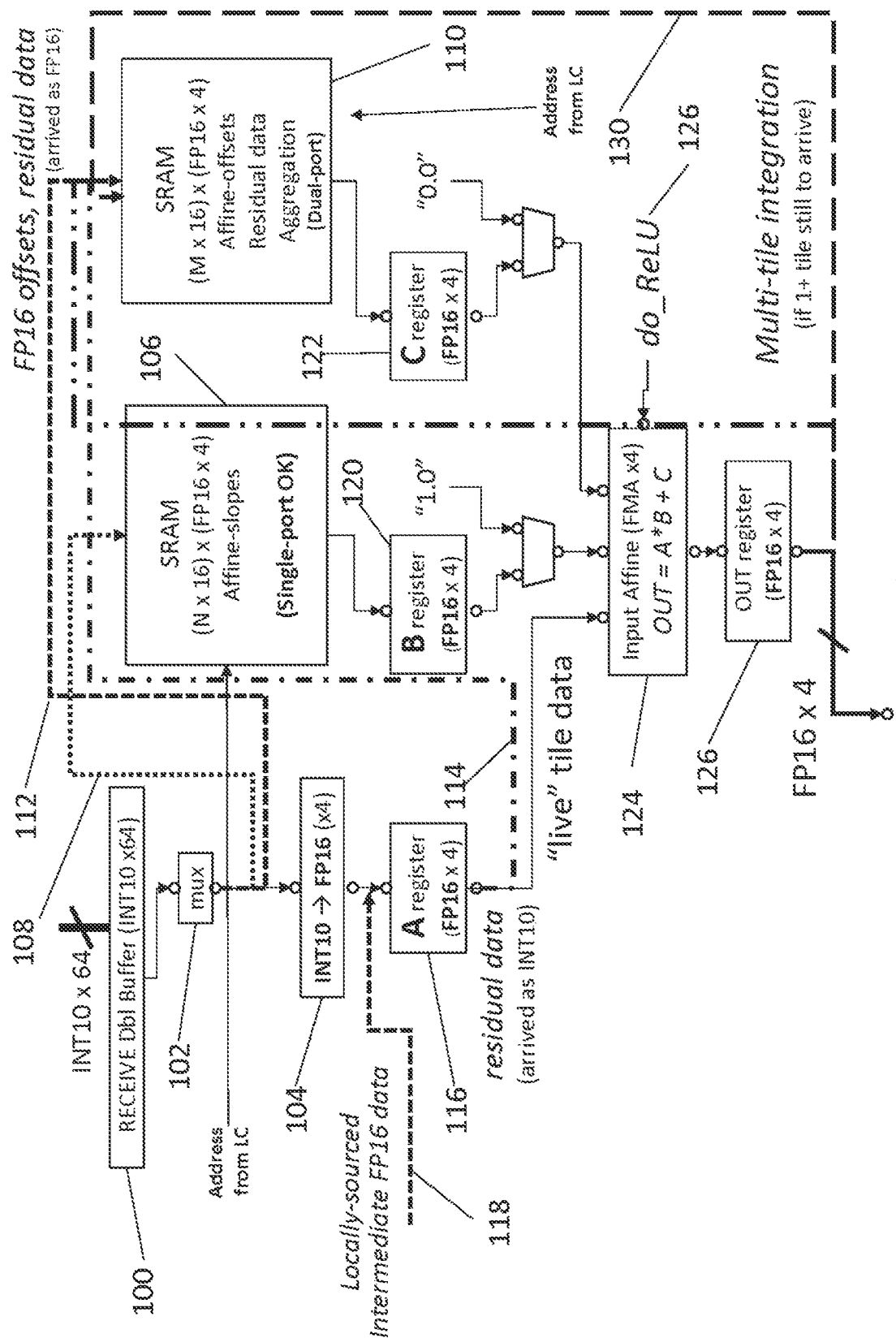
FIG. 1 is a representation of a method for efficient vectorized-scaling, aggregation, and rectified-linear operations according to an illustrative embodiment.

Referring to FIG. 1, in an illustrative embodiment, binary data arrives to be scaled in parallel in integer-10 (INT10) format in a double-buffer RCV-register 100 ("Receive" register), and is multiplexed out over 16 successive time-steps with a multiplexer 102. For instance, if each half of the RCV-register 100 contains 64 INT10 data-elements, then this data is multiplexed out four INT10 values in each cycle.

In one embodiment, the four INT10 data-elements are converted to floating point-16 (FP16) format in converter block 104, producing four FP16 data-elements which travel through the rest of the affine-in-scale compute-hardware as described below. In an alternative implementation, data remains in INT10 format throughout the affine-in-scale hardware, with all multiply and add operations performed in INT10, with choice of right-shifts after multiply to keep output data within the INT10 range. In this implementation, both slope, offset and aggregation data are stored in INT10 or sign-magnitude-10 (SM10) format.

Data can be stored into a slope SRAM 106 and an offset SRAM 110 in three possible ways without passing through any fused multiply-add (FMA) modules. First, FP16 data can be stored from the RCV-register 100 directly into the slope SRAM 106 as shown by the dotted line 108. In this scenario, one of the two double-buffer RCV registers, e.g., "buffer0," is considered to hold the upper 8-bits of the FP16 data-element, while the other double-buffer, "buffer1," encodes the lower 8-bits.

Similarly, FP16 data can be transferred directly into the offset SRAM 110 as shown by the short-dashed line 112. Alternatively, FP16 data generated from incoming INT10 data can be stored directly into the offset SRAM as shown in the dash-dot-dash line 114.

Similarly, four FP16 data-elements can arrive in the A register 116, either by direct conversion of four INT10 data-elements from one of the RCV double-buffers 100, or by transfer of four intermediate data-elements already in FP16 format from other nearby compute circuitry via dashed line 118.

As four data-elements arrive in the A register 116, simultaneously the B register 120 and the C register 122 are loaded with four slopes and four offsets by reading one row of the Slope and Offset SRAM 106 into these registers. Alternatively, the B register 120 and/or C register 122 can be replaced by their default values (slope of "1.0", offset of "0.0").

The four data-elements in each of the A, B and C registers 116, 120, 122 are input into a 4-way Fused-Multiply-Add (FMA) unit 124, allowing independent calculation of four output data-elements by OUT=A*B+C. A simple switch can be used to perform a ReLU operation 126 if desired (in the case of aggregation across vectors arriving from multiple tiles, this should only be enabled when processing the vector for the last tile in the sum).

For the last tile in a multi-tile aggregation, the four data-elements produced by the FMA unit 124 can be sent onto subsequent processing via an out register 128, providing a pipelined stream of scaled and aggregated outputs, so that any next stage of processing can be initiated without delay.

For any tile other than the last tile, these four data-elements can be written back into the dual-port Offset SRAM 110 as shown by the long dash line 130, using write-address values dedicated for aggregation data. Throughout the processing of multiple tiles, the C register 122 is retrieved from these aggregation rows, except for the 1st tile when the appropriate offset scaling factors are used. Alternatively, stored residual data from an earlier neural network step can be used in the place of offset data.

In an exemplary embodiment, the use of N=12 supports scaling across up to 12 different tiles, while M=4 supports two sets of offsets, one set of residual data while supporting an isolated set of rows for frequent update during multi-tile aggregation.

Thanks to the tightly-pipelined compute, close coordination with dedicated the slope SRAM 106 and the offset SRAM 110, including multiple paths for storing data, the current disclosure provides special-purpose compute hardware which can efficiently perform scale, offset, aggregation, and ReLU operations across a large number of incoming data-vectors, at either FP16 or at a reduced precision such as INT10.

In some embodiments, the multiplexer 102 provides the 64 INT10 data into 16 sets of four, ordered from zero to 15, it should be understood that the system does not need to retrieve the data in any particular order. For example, the slope SRAM 106 and/or the offset SRAM 110 could be programmatically controlled to provide the data in any particular order. Similarly, the multiplexer 102 could also be programmatically controlled to order the data in a predetermined order into the SRAM 106 and/or the offset SRAM 110. Similarly, the offset values back to the offset SRAM 110, via long dash line 130, could be programmatically controlled so that the order is predetermined as may be required for the particular application.

Example Process

Figure 2:
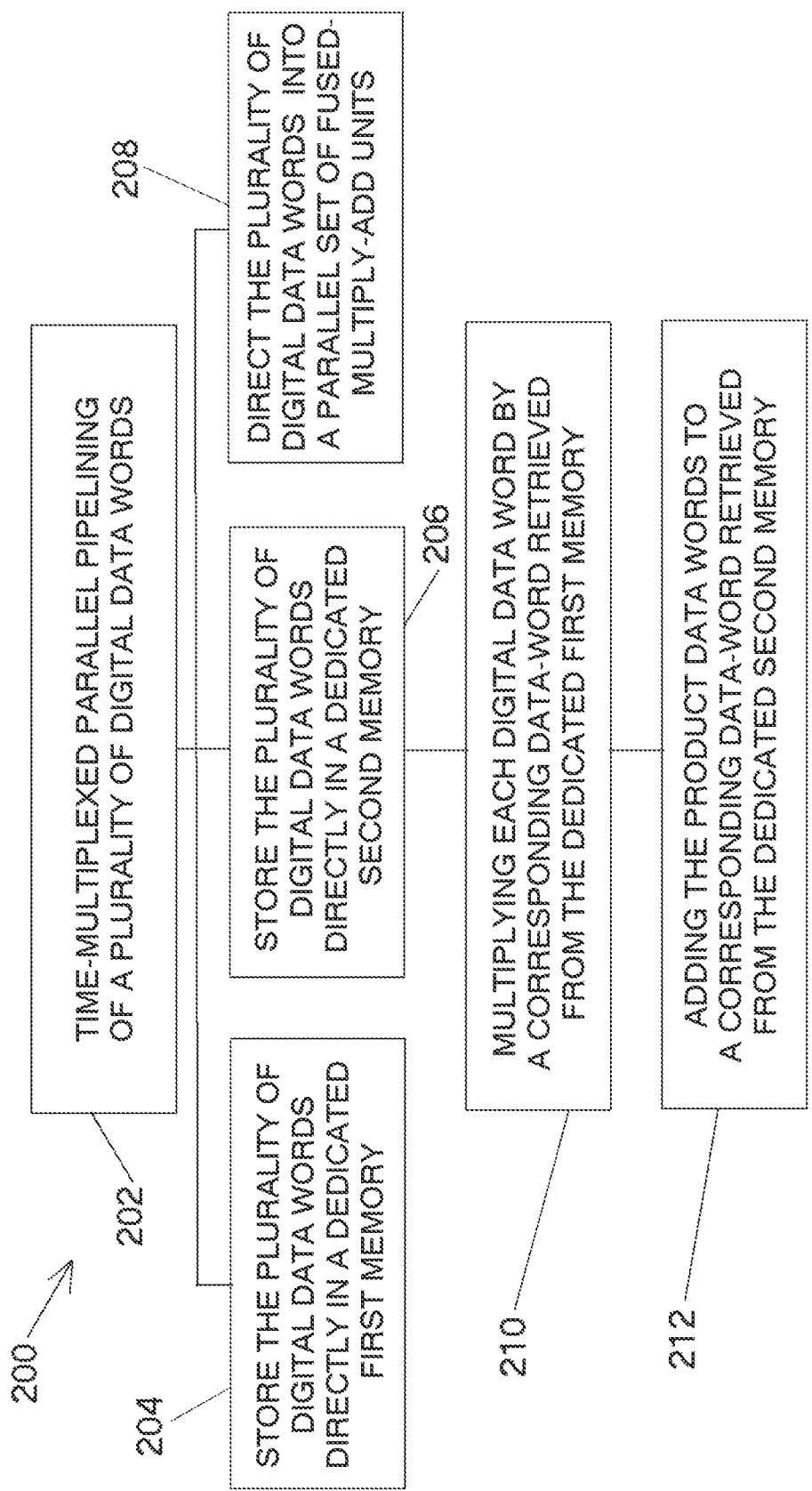
FIG. 2 is a flow chart exemplifying a method for efficient vectorized-scaling, aggregation, and rectified-linear operations according to an illustrative embodiment.

It may be helpful now to consider a high-level discussion of example processes. To that end, FIG. 2 presents an illustrative process 200 related to the methods for efficient vectorized-scaling, aggregation, and rectified-linear operations. Process 200 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 2, the process 200 can include an act 202 of time-multiplexed parallel pipelining of a plurality of digital data words. According to exemplary embodiments, each of the plurality of digital data words encode an N-bit signed integer, from one of a plurality of receive-registers through a datapath that can either, in an act 204, store the plurality of digital data words directly in a dedicated first memory, or, in an act 206, store the plurality of digital data words directly in a dedicated second memory, or, in an act 208, direct the plurality of digital data words into a parallel set of fused-multiply-add units. The dedicated first memory can be a slope memory located directly next to processing units for energy-efficient access. The dedicated second memory can be an offset/aggregation/residual memory located directly next to processing units for energy-efficient access. The offset/aggregation/residual memory can be a dual port memory.

The process 200 can include an act 210 of multiplying each digital data word by a corresponding data-word retrieved from the dedicated first memory to form product data words. The process 200 can further include an act 212 of adding the product data words to a corresponding data-word retrieved from the dedicated second memory to form an output sum-and-product data words. The process 200 may include further steps as described above, including an optional act of performing a ReLU operation, storing an aggregation result in the offset/aggregation/residual SRAM, and programmatically controlling the multiplexer, slop SRAM and offset SRAM to specifically order the data as desired.

Example Computing Platform

Figure 3:
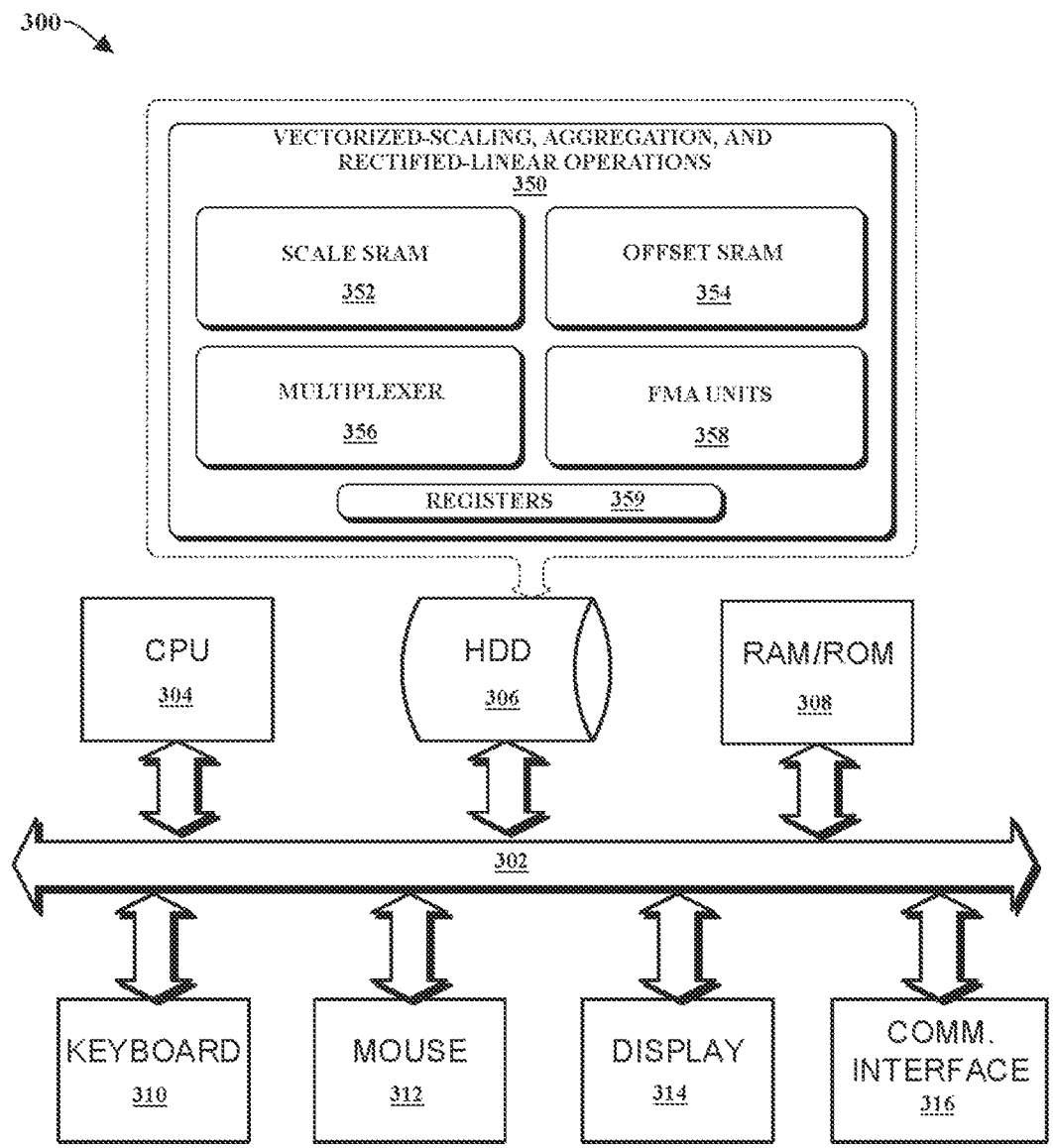
FIG. 3 is a functional block diagram illustration of a computer hardware platform that can be used to implement the method for efficient vectorized-scaling, aggregation, and rectified-linear operations according to FIG. 1.

FIG. 3 provides a functional block diagram illustration of a computer hardware platform 300 that can be used to implement a particularly configured computing device that can host compute hardware 350 for efficient vectorized-scaling, aggregation, and rectified-linear operations. The compute hardware 350 can include a scale SRMA 352, such as the scale SRAM 106 discussed above, an offset SRAM 354, such as the offset SRAM 110 discussed above, a multiplexer 356, such as the multiplexer 102 discussed above, an FMA unit 358, such as the FMA unit 124 discussed above, and registers 359, such as the registers 116, 120, 122 discussed above.

The computer platform 300 may include a central processing unit (CPU) 310, a hard disk drive (HDD) 320, random access memory (RAM) and/or read only memory (ROM) 330, a keyboard 350, a mouse 360, a display 370, and a communication interface 380, which are connected to a system bus 340. In one embodiment, the compute hardware 350 has capabilities that include performing efficient vectorized-scaling, aggregation, and rectified-linear operations, as discussed above.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A method for efficient vectorized-scaling, aggregation, and rectified-linear operations in a digital computing hardware, the method comprising:
   time-multiplexed parallel pipelining of a plurality of digital data words, by the digital computing hardware, each of the plurality of digital data words encoding an N-bit signed integer, from one of a plurality of receive-registers through a datapath;
   performing, by the digital computing hardware, one of:
      storing the plurality of digital data words directly in a dedicated first memory;
      storing the plurality of digital data words directly in a dedicated second memory; or
      directing the plurality of digital data words into a parallel set of fused- multiply-add units;
   multiplying each digital data word of the plurality of digital data words, by a corresponding data-word retrieved from the dedicated first memory to form product data words; and
   adding the product data words to a corresponding data-word retrieved from the dedicated second memory to form an output sum-and-product data words.

2. The method of claim 1, wherein the dedicated first memory is a slope memory located directly next to processing units for energy-efficient access.

3. The method of claim 1, wherein the dedicated second memory is an offset/aggregation/residual memory located directly next to processing units for energy-efficient access.

4. The method of claim 3, wherein the offset/aggregation/residual memory is a dual port memory.

5. The method of claim 1, further comprising performing, by each of the fused-multiply-add units, a rectified-linear operation.

6. The method of claim 5, further comprising replacing each of the plurality of data words having a negative value by zero.

7. The method of claim 1, further comprising storing the output sum-and-product data words back into the dedicated second memory as an aggregation result.

8. The method of claim 7, further comprising programmatically controlling the output sum-and-product data words to provide the aggregation result to the dedicated second memory in a predetermined order.

9. The method of claim 1, further comprising directing the output sum-and-product data words to further time-multiplexed and pipelined data processing stages capable of processing sum-and-product data words.

10. The method of claim 1, further comprising:
   before storage into either the dedicated first memory or the dedicated second memory, reinterpreting each of the plurality of data words from N-bit signed integer representation into a more than N-bit floating bit representation either by concatenating data-words across the plurality of data-words or by concatenating across a plurality of time-multiplexed steps; and
   before directing the plurality of digital data words to the fused-multiply-add units, directly converting each data word from N-bit signed-integer representation to the more-than-N-bit floating-point representation.

11. The method of claim 10, wherein all computation and data-word storage are performed in the more-than-N-bit floating-point representation.

12. The method of claim 11, wherein the more-than-N-bit floating-point representation is a floating point-16 representation.

13. The method of claim 1, further comprising programmatically controlling the dedicated first memory and the dedicated second memory to provide data words in a predetermined order.

14. A computer implemented method for efficient vectorized-scaling, aggregation, and rectified-linear operations, the method comprising:
   time-multiplexed parallel pipelining of a plurality of digital data words, each of the plurality of digital data words encoding an N-bit signed integer, from one of a plurality of receive-registers through a datapath;
   performing one of:
      storing the plurality of digital data words directly in a slope memory located directly next to processing units for energy-efficient access;
      storing the plurality of digital data words directly in an offset/aggregation/residual memory, configured as a dual port memory, located directly next to processing units for energy-efficient access; or
      directing the plurality of digital data words into a parallel set of fused-multiply-add units;
   multiplying each digital data word by a corresponding data-word retrieved from the slope memory to form product data words; and
   adding the product data words to a corresponding data-word retrieved from the offset/aggregation/residual memory to form an output sum-and-product data words.

15. The computer implemented method of claim 14, further comprising storing the output sum-and-product data words back into the offset/aggregation/residual memory as an aggregation result.

16. The computer implemented method of claim 15, further comprising:
   programmatically controlling the output sum-and-product data words to provide the aggregation result to the offset/aggregation/residual memory in a predetermined order; and
   programmatically controlling the dedicated first memory and the dedicated second memory to provide data words in a predetermined order.

17. The computer implemented method of claim 14, further comprising:
before storage into either the slope memory or the offset/aggregation/residual memory, reinterpreting each of the plurality of data words from N-bit signed integer representation into a more than N-bit floating bit representation either by concatenating data-words across the plurality of data-words or by concatenating across a plurality of time-multiplexed steps; and
before directing the plurality of digital data words to the fused-multiply-add units, directly converting each data word from N-bit signed-integer representation to the more-than-N-bit floating-point representation,
wherein all computation and data-word storage are performed in the more-than-N-bit floating-point representation.

18. A non-transitory computer readable storage medium tangibly embodying a computer readable program code having computer readable instructions that, when executed, causes a computer device to carry out a method for efficient vectorized-scaling, aggregation, and rectified-linear operations, the method comprising:
time-multiplexed parallel pipelining of a plurality of digital data words, each of the plurality of digital data words encoding an N-bit signed integer, from one of a plurality of receive-registers through a datapath that can;
performing one of:
storing the plurality of digital data words directly in a slope memory located directly next to processing units for energy-efficient access;
storing the plurality of digital data words directly in an offset/aggregation/residual memory, configured as a dual port memory, located directly next to processing units for energy-efficient access; or
directing the plurality of digital data words into a parallel set of fused-multiply-add units;
multiplying each digital data word by a corresponding data-word retrieved from the slope memory to form product data words; and
adding the product data words to a corresponding data-word retrieved from the offset/aggregation/residual memory to form an output sum-and-product data words.

19. The non-transitory computer readable storage medium of claim 18, the method further comprising:
storing the output sum-and-product data words back into the offset/aggregation/residual memory as an aggregation result;
programmatically controlling the output sum-and-product data words to provide the aggregation result to the offset/aggregation/residual in a predetermined order; and
programmatically controlling the dedicated first memory and the dedicated second memory to provide data words in a predetermined order.

20. The non-transitory computer readable storage medium of claim 18, the method further comprising:
before storage into either the slope memory or the offset/aggregation/residual memory, reinterpreting each of the plurality of data words from N-bit signed integer representation into a more than N-bit floating bit representation either by concatenating data-words across the plurality of data-words or by concatenating across a plurality of time-multiplexed steps; and
before directing the plurality of digital data words to the fused-multiply-add units, directly converting each data word from N-bit signed-integer representation to the more-than-N-bit floating-point representation,
wherein all computation and data-word storage are performed in the more-than-N-bit floating-point representation.

* * * * *